US009242559B2

United States Patent
Ojima

(10) Patent No.: US 9,242,559 B2
(45) Date of Patent: Jan. 26, 2016

(54) IN-VEHICLE POWER SOURCE DEVICE

(71) Applicant: SUZUKI MOTOR CORPORATION, Shizuoka (JP)

(72) Inventor: Hiroyuki Ojima, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 528 days.

(21) Appl. No.: 13/683,811

(22) Filed: Nov. 21, 2012

(65) Prior Publication Data

US 2013/0175856 A1 Jul. 11, 2013

(30) Foreign Application Priority Data

Jan. 11, 2012 (JP) ................................. 2012-003002

(51) Int. Cl.
| | |
|---|---|
| B60L 11/12 | (2006.01) |
| B60L 1/00 | (2006.01) |
| B60L 3/00 | (2006.01) |
| B60L 11/18 | (2006.01) |

(52) U.S. Cl.
CPC ................. B60L 1/00 (2013.01); B60L 3/0023 (2013.01); B60L 11/12 (2013.01); B60L 11/1868 (2013.01); B60L 2240/12 (2013.01); B60L 2240/545 (2013.01); B60L 2240/547 (2013.01); B60L 2240/549 (2013.01); Y02T 10/7005 (2013.01); Y02T 10/7066 (2013.01); Y02T 10/7077 (2013.01)

(58) Field of Classification Search
CPC .............. H02J 7/00; B60L 1/00; B60L 11/12; B60L 3/0023; B60L 11/1868
See application file for complete search history.

(56) References Cited

U.S. PATENT DOCUMENTS 3,683,258 A * 8/1972 Harbonn ........................ 320/103
4,899,083 A * 2/1990 Kataoka et al. ................. 315/77
(Continued)

FOREIGN PATENT DOCUMENTS

| | | | |
|---|---|---|---|
| JP | 58009557 | * 1/1983 | ............. H02K 19/36 |
| JP | 2011-15516 A | 1/2011 | |
| JP | 2011-78147 A | 4/2011 | |

OTHER PUBLICATIONS

Office Action mailed Nov. 3, 2014 in corresponding Chinese Patent Application No. 201210489134.5 (with an English translation) (10 pages).
Notice of Allowance mailed Jul. 3, 2015 in corresponding Chinese Patent Application No. 201210489134.5 (2 pages).
(Continued)

Primary Examiner — Zeev V Kitov
(74) Attorney, Agent, or Firm — Rothwell, Figg, Ernst & Manbeck, P.C.

(57) ABSTRACT

There is provided an in-vehicle power source device having favorable workability for replacing a fuse that melts down when an overcurrent flows to an electric load. A battery selector switch 51 having a current detecting function, a main relay 52 having current detecting function, a bypass relay 54 for bypassing the battery selector switch 51, and a bypass fuse 53 to melt down when an overcurrent flows to a second electric load 35 are provided. The bypass fuse 53 is deployed outside of a case 58 for storing a second power source 34, the bypass fuse 53 and the second power source 34 are connected in series, and when currents detected by the battery selector switch 51 and the main relay 52 are equal to or greater than a predetermined value, the battery selector switch 51 and the main relay 52 are turned off and the bypass relay 54 is closed.

10 Claims, 13 Drawing Sheets

(56) References Cited

U.S. PATENT DOCUMENTS 6,855,008 B1 * 2/2005 Freitag et al. ............ 439/620.26
2011/0001352 A1   1/2011 Tamura et al.
2012/0056587 A1 * 3/2012 Iida et al. ...................... 320/118
2013/0318956 A1 * 12/2013 Yunoue et al. .................. 60/420

OTHER PUBLICATIONS

Notice of Allowance mailed Sep. 15, 2015 in corresponding Japanese Patent Application No. 2012-003002 (1 page.)

* cited by examiner

IN-VEHICLE POWER SOURCE DEVICE

CROSS-REFERENCE

This document claims priority to Japanese Application Number 2012-003002, filed Jan. 11, 2012, the entire content of which is hereby incorporated by reference.

TECHNICAL FIELD

The present invention relates to an in-vehicle power source device including two power sources for supplying power to at least one electric load, and a fuse to melt down if an overcurrent flows to the electric load.

BACKGROUND ART

FIG. 7 is a block diagram illustrating an idle stop system having a conventional in-vehicle power source device. As illustrated in the drawing, an idle stop controller 1 inputs signals from a vehicle speed sensor 2, an idle stop prohibiting switch 3, a brake switch 4, a brake pressure sensor 5, an engine water temperature sensor 6, an engine hood switch 7, a seat belt switch 8, a driver seat door switch 9, a mission shift position sensor 10, an axel opening sensor 11, a battery temperature sensor 12 for a first power source, a battery current sensor 13 for the first power source, and a battery voltage sensor 14 for the first power source, wherein the first power source is a lead battery. The idle stop controller 1 also inputs signals of state of charge and temperature of a second power source from a battery management unit 15 for the second power source, which is a secondary battery, and controls the battery management unit 15. Moreover, the idle stop controller 1 controls an engine controller 16, a hill holding valve 19, an oil pump 20, an indicator 21, and a starter 22. Furthermore, the engine controller 16 controls an injector 17 and an alternator 18. The in-vehicle power source device having the first power source and the second power source supplies power to the idle stop controller 1. Furthermore, the idle stop controller 1 monitors states of the first power source and the second power source, and determines whether idle stop is possible.

FIG. 8 illustrates a power source system of the conventional in-vehicle power source device. As illustrated in the drawing, a first electric load 31, a first power source 32, which is a lead battery, an alternator 33, a second power source 34, which is a secondary battery, and a second electric load 35 are connected in parallel. A first fuse 36 is connected between the first electric load 31 and the first power source 32. A second fuse 37 is connected between the first electric load 32 and the alternator 33. A third fuse 38 and a battery selector switch (SW) 39 are connected in series between the alternator 33 and the second power source 34. A fourth fuse 40 is connected between the second power source 34 and the second electric load 35. A normally closed-type bypass relay 41 is connected in parallel to the battery selector switch 39. A main relay 42 is connected between the second power source 34 and the fourth fuse 40 (the second electric load 35). A battery pack 43 includes the second power source 34, the battery selector switch 39, the fourth fuse 40, the bypass relay 41, and the main relay 42. The second power source 34, the battery selector switch 39, the fourth fuse 40, the bypass relay 41, and the main relay 42 are stored in a case 44 of the battery pack 43.

Operations of the in-vehicle power source device illustrated in FIG. 8 will be explained with reference to FIG. 9.

In an operation 1, the battery selector switch 39 is turned on (ON), the bypass relay 41 is opened (OPEN), and the main relay 42 is turned off (OFF). In this state, the first power source 32, the alternator 33, and the second electric load 35 are connected, but the second power source 34 and the alternator 33 are not connected. Changing to this state is done when wishing to charge the first power source 32 right after starting an engine, for example, or when putting the alternator 3 in a non-power generation state, and supplying power to the first electric load 31 and the second electric load 35 only from the first power source 32.

In an operation 2, the battery selector switch 39 is turned on (ON), the bypass relay 41 is opened (OPEN), and the main relay 42 is turned on (ON). In this state, the first power source 32, the alternator 33, the second power source 34, and the second electric load 35 are connected. Changing to this state is done when storing electric energy generated by the alternator 33 in the second power source 34 during regenerative deceleration, etc.

In an operation 3, the battery selector switch 39 is turned off (OFF), the bypass relay 41 is opened (OPEN), and the main relay 42 is turned on (ON). In this state, the first electric load 31, the first power source 32, and the alternator 33 are connected, and the second power source 34 and the second electric load 35 are connected. Therefore, the electric energy stored in the second power source 34 can be supplied to the second electric load 35. Changing to this state is done when wishing to supply power to the second electric load 35 only from the second power source 34, so as to reduce a generating load on the alternator 33 and improve fuel consumption during normal running or idling stop.

In an operation 4, the battery selector switch 39 is turned off (OFF), the bypass relay 41 is closed (CLOSE), and the main relay 42 is turned off (OFF). In this state, the first electric load 31, the first power source 32, the alternator 33, and the second electric load 35 are connected. Note that the first electric load 31, the first power source 32 and the alternator 33 are connected to the second electric load 35 via the bypass relay 41. Changing to this state is done when supplying dark current to the second electric load 35 from the first power source 32 when the ignition switch (SW) is off, etc. Changing to this state is done when the battery pack 43 becomes abnormal.

PRIOR ART DOCUMENTS

Patent Documents

Patent Document 1: JP 2011-15516 A
Patent Document 2: JP 2011-78147 A

SUMMARY OF THE INVENTION

Problems to be Solved

However, with such an in-vehicle power source device, as illustrated in FIG. 10, when an electric wire (wire harness) for connecting an output unit of the battery pack 43 and the second electric load 35 touches the vehicle body or the like and short-circuits, the fourth fuse 40 melts down. That is, in the case of the above-given operation 1, power is supplied from the first power source 32 to the second electrical load 35 via the battery selector switch 39, and if it short circuits in this case, a large current flows from the first power source 32 toward a short-circuit portion A, as indicated by line a, and the fourth fuse 40 then melts down. Moreover, in the case of the above-given operation 3, power is supplied from the second power source 34 to the second electrical load 35 via the main relay 42. If it short circuits in this case, a large current flows from the second power source 34 toward a short-circuit portion A, as indicated by line b, and the fourth fuse 40 then melts down. Furthermore, in the case of the above-given operation 4, power is supplied from the first power source 32 to the second electrical load 35 via the bypass relay 41 when the ignition switch (SW) is off. If it short circuits in this case, a large current flows from the first power source 32 toward a short-circuit portion A, as indicated by line c, and the fourth fuse 40 then melts down.

When using such an in-vehicle power source device as a power source of the idling stop system, the fourth fuse 40 is provided within the case 44 of the battery pack 43 for protecting the electric wire that connects the second power source 34 and the second electric load 35. Therefore, in order to replace the fourth fuse 40 which is melted down, the lid of the case 44 must be removed to remove the fourth fuse 40, and there is a possibility that it will touch the second power source 34. Moreover, depending on where the battery pack 43 is provided in the vehicle, there are cases where replacing the fourth fuse 40 is impossible. As such, workability for replacing the fourth fuse 40 that melts down when an overcurrent flows to the second electric load 35 is not favorable.

Note that while the fourth fuse 40 of the battery pack 43 may be made non-replaceable from the start, in this case, when the fourth fuse 40 melts down, replacement of the battery pack 43 itself is desired, leading to increase in costs for resupply and maintenance.

Furthermore, as illustrated in FIG. 11, while providing the fourth fuse 40a on the electric wire connecting the output unit of the battery pack 43 and the second electric load 35, in this case, it is necessary to provide an exclusive fuse socket near the battery pack 43, thereby increasing costs.

Yet further, as illustrated in FIG. 12, when the electric wire connecting the fourth fuse 40a and the second electric load 35 short circuits, melting down of the fourth fuse 40 prevents a large current from flowing from the first power source 32, the alternator 33 or the second power source 34 to a short-circuit portion B. However, when the electric wire connecting the output unit of the battery pack 43 and the fourth fuse 40a has short circuited, a large current cannot be prevented from flowing from the first power source 32, the alternator 33 or the second power source 34 toward a short-circuit portion C, thereby possibly causing a failure of the electric wire or the substrate of the battery pack 43.

Note that when fast charging the second power source 34 during regenerative deceleration, a large current must flow from the alternator 33 to the second power source 34, and thus fuse capacity of the third fuse 38, which is provided between the alternator 33 and the input unit of the battery pack 43, is increased. Therefore, as illustrated in FIG. 13, when the electric wire connecting the output unit of the battery pack 43 and the second electric load 35 has short circuited, in the case where the fourth fuse is not provided, a large current flows from the alternator 33 toward a short-circuit portion D, thereby possibly causing a failure of the electric wire or the substrate of the battery pack 43.

The present invention has been devised so as to resolve such problems, and an object thereof is to provide an in-vehicle power source device having favorable workability for replacing a fuse that melts down when an overcurrent flows to an electric load.

Solution to the Problem

In order to achieve such an object, an aspect of the present invention is characterized in that an in-vehicle power source device includes: a first power source and a second power source for providing power to at least one electric load; a first opening-closing switch provided along a feed line between the electric load and the first power source; a second opening-closing switch provided along a feed line between the electric load and the second power source; a bypass switch for bypassing the first opening-closing switch; and a fuse to melt down when an overcurrent flows to the electric load. The in-vehicle power source device further includes a current detector for detecting a current flowing to the electric load. The fuse is deployed outside of a case for storing the second power source device, the fuse and the bypass switch are connected in series, and when a current detected by the current detector is equal to or greater than an a predetermined value, the first opening-closing switch and the second opening-closing switch are turned off and the bypass switch is turned on.

Further, an aspect of the present invention is characterized in that the bypass switch is deployed outside of the case.

Yet further, an aspect of the present invention is characterized in that the current detector includes a first current detector for detecting a current flowing to the first opening-closing switch, and a second current detector for detecting a current flowing to the second opening-closing switch, and when a total sum of a current detected by the first current detector and a current detected by the second current detector current is equal to or greater than an a predetermined value, the first opening-closing switch and the second opening-closing switch are turned off and the bypass switch is turned on.

Yet further, an aspect of the present invention is characterized in that the first current detector is provided within the first opening-closing switch, and the second current detector is provided within the second opening-closing switch.

Advantageous Effect of the Invention

With the in-vehicle power source device according to the present invention, since a fuse that melts down when an overcurrent flows to an electric load is deployed outside of a case, workability for replacing the fuse is favorable.

DESCRIPTION OF EMBODIMENTS

First Embodiment

Figure 1:
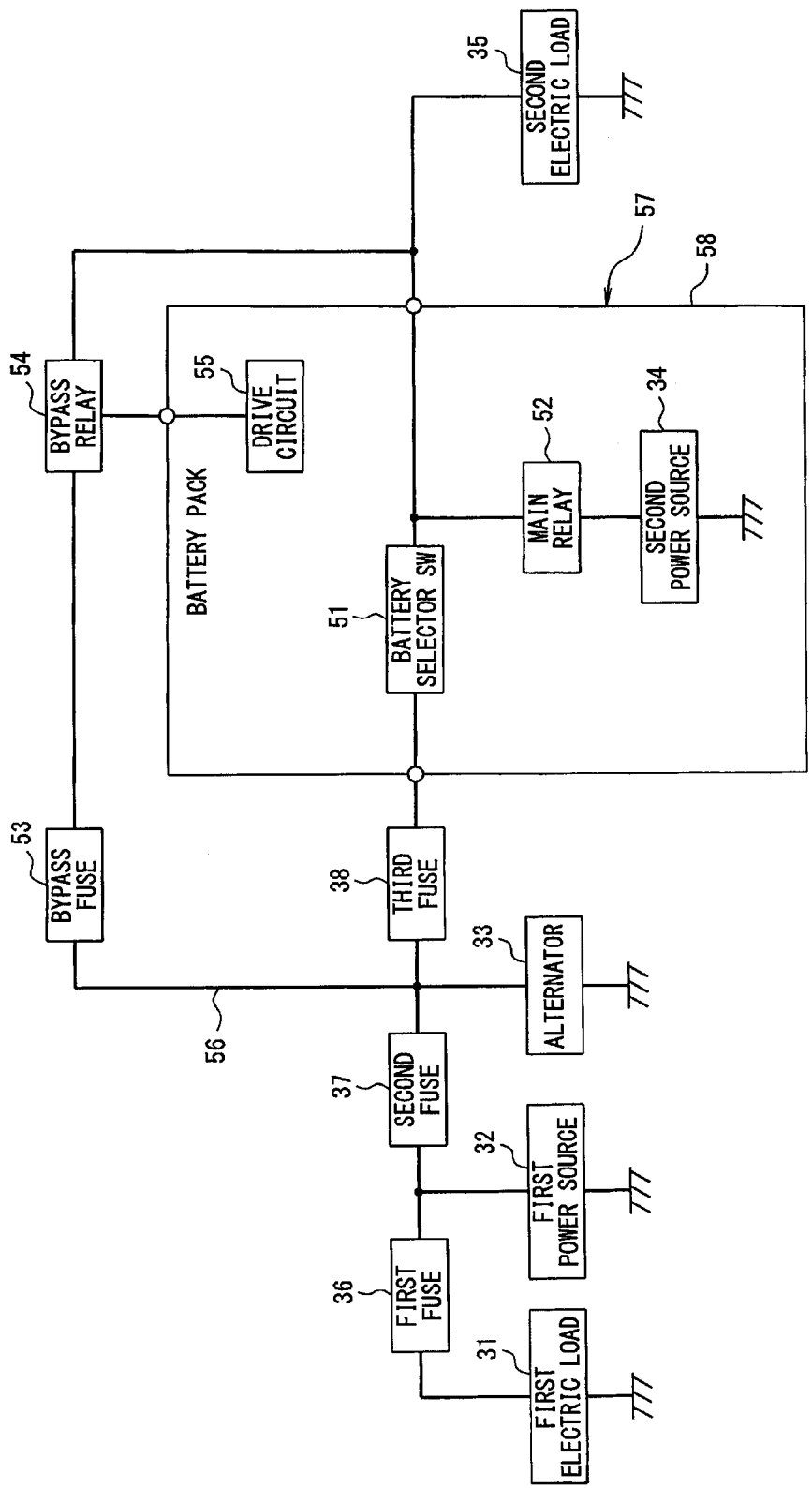
FIG. 1 illustrates a power source system of an in-vehicle power source device, according to an embodiment of the present invention.

An in-vehicle power source device according to an embodiment of the present invention will be described with reference to FIG. 1.

A first electric load 31, a first power source 32, an alternator 33, a second power source 34, and a second electric load 35 are connected in parallel, and first through third fuses 36 to 38 are provided. A battery selector switch (SW) 51 having a current detecting function is connected in series to the third fuse 38 between the alternator 33 and the second power source 34. That is, the battery selector switch 51 (first opening-closing switch) is provided along a feed line between the second electric load 35 and the first power source 32. A main relay 52 having a current detecting function is connected between the second electric load 35 and the second power source 34. That is, the main relay 52 (second opening-closing switch) is provided along a feed line between the second electric load 35 and the second power source 34. A bypass circuit 56 connecting the second fuse 37 and the third fuse 38 and also connecting an output unit of a battery pack 57 and the second electric load 35 is deployed. A normally closed-type bypass relay 54 and a bypass fuse 53 are connected in series to the bypass circuit 56. That is, the bypass relay 54 bypasses the battery selector switch 51. A drive circuit 55 for driving the bypass relay 54 is provided. The bypass fuse 53 melts down when an overcurrent flows to the second electric load 35. The battery pack 57 includes the second power source 34, the battery selector switch 51, the main relay 52, and the drive circuit 55. The second power source 34, the battery selector switch 51, the main relay 52, and the drive circuit 55 are stored in a case 58 of the battery pack 57. The bypass fuse 53 and the bypass relay 54 are deployed outside of the case 58.

Figure 2:
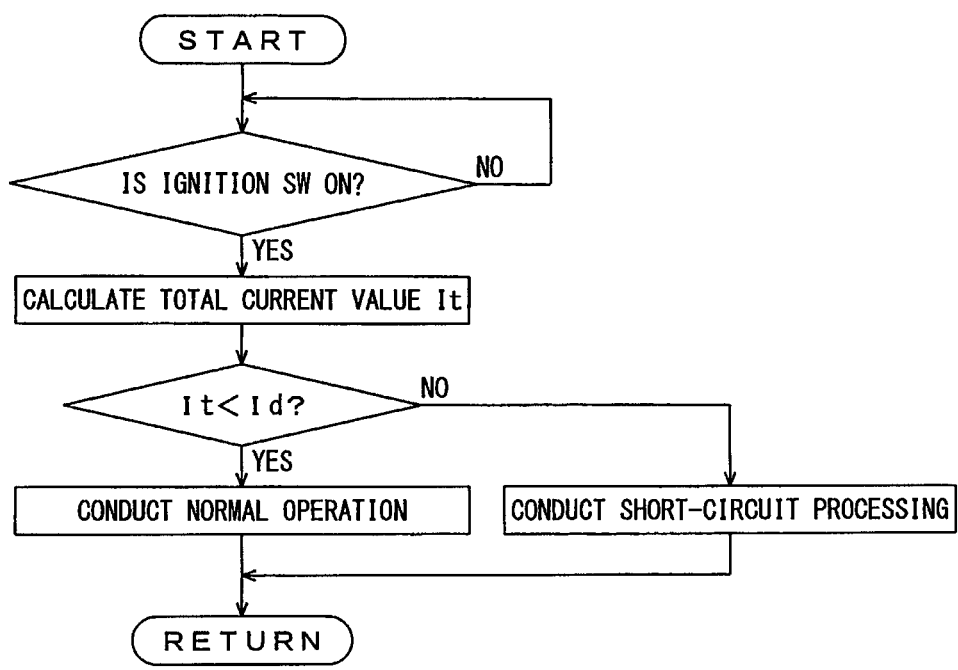
FIG. 2 is a flowchart for explaining operations of the in-vehicle power source device illustrated in FIG. 1.

Operations of the in-vehicle power source device illustrated in FIG. 1 will be explained with reference to FIG. 2.

When the ignition switch (SW) is turned on, a battery management unit (not illustrated) provided inside of the battery pack 57 adds a current value detected by the battery selector switch 51 and a current value detected by the main relay 52 so as to calculate a total current value It. If the total current value It is less than a predetermined value Id, normal operation is conducted. Otherwise, if the total current value It is equal to or greater than the predetermined value Id, it is determined that a short circuit has occurred, and short circuit processing is then conducted. That is, the battery selector switch 51 and the main relay 52 are turned off, and the bypass relay 54 is closed. Note that also when the battery pack 57 is abnormal, and when the ignition switch is off, the battery selector switch 51 and the main relay 52 are turned off, and the bypass relay 54 is closed (turned on).

Figure 3:
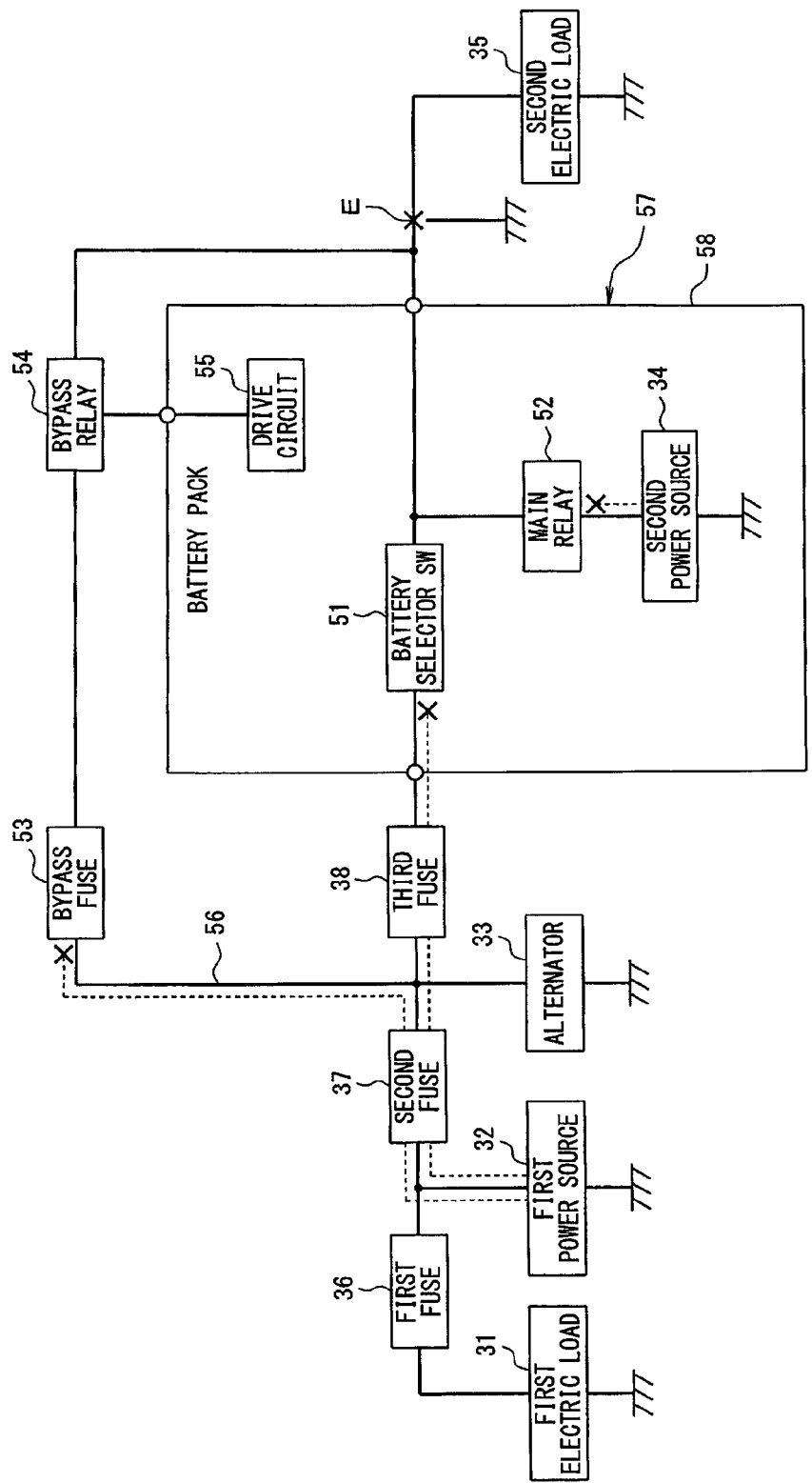
FIG. 3 is a diagram for explaining operations of the in-vehicle power source device illustrated in FIG. 1.
Figure 4:
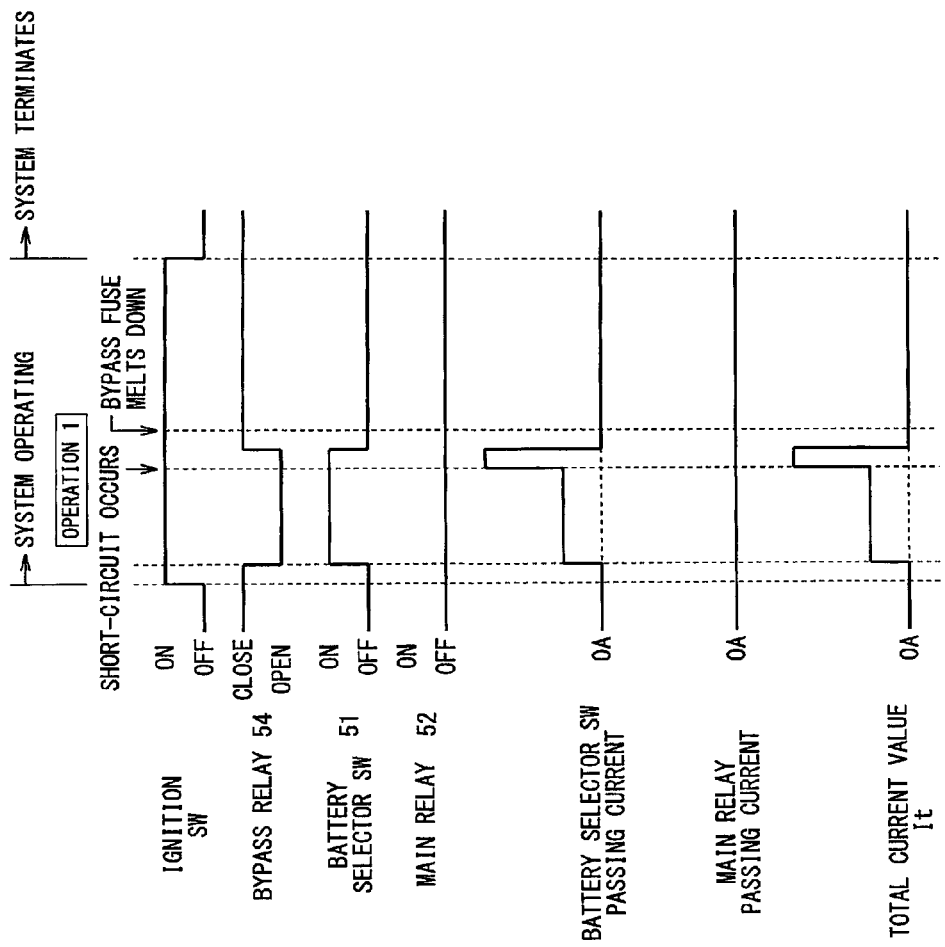
FIG. 4 is a time chart for explaining operations of the in-vehicle power source device illustrated in FIG. 1.

With this in-vehicle power source device, as in the above operation 1, if the electric line connecting the output unit of the battery pack 57 and the second electric load 35 has short circuited, as illustrated in FIG. 3, while power is being supplied to the second electric load 35 from the first power source 32, the current flowing to the battery selector switch 51 increases, and the total current value It becomes equal to or greater than the predetermined value Id, as illustrated in FIG. 4. Therefore, the battery selector switch 51 is turned off and the bypass relay 54 is closed, and the bypass fuse 53 thus melts down. As a result, a large current can be prevented from flowing from the first power source 32 toward a short circuit portion E. Accordingly, failure of the electric wire and the substrate of the battery pack 57 do not occur.

Figure 5:
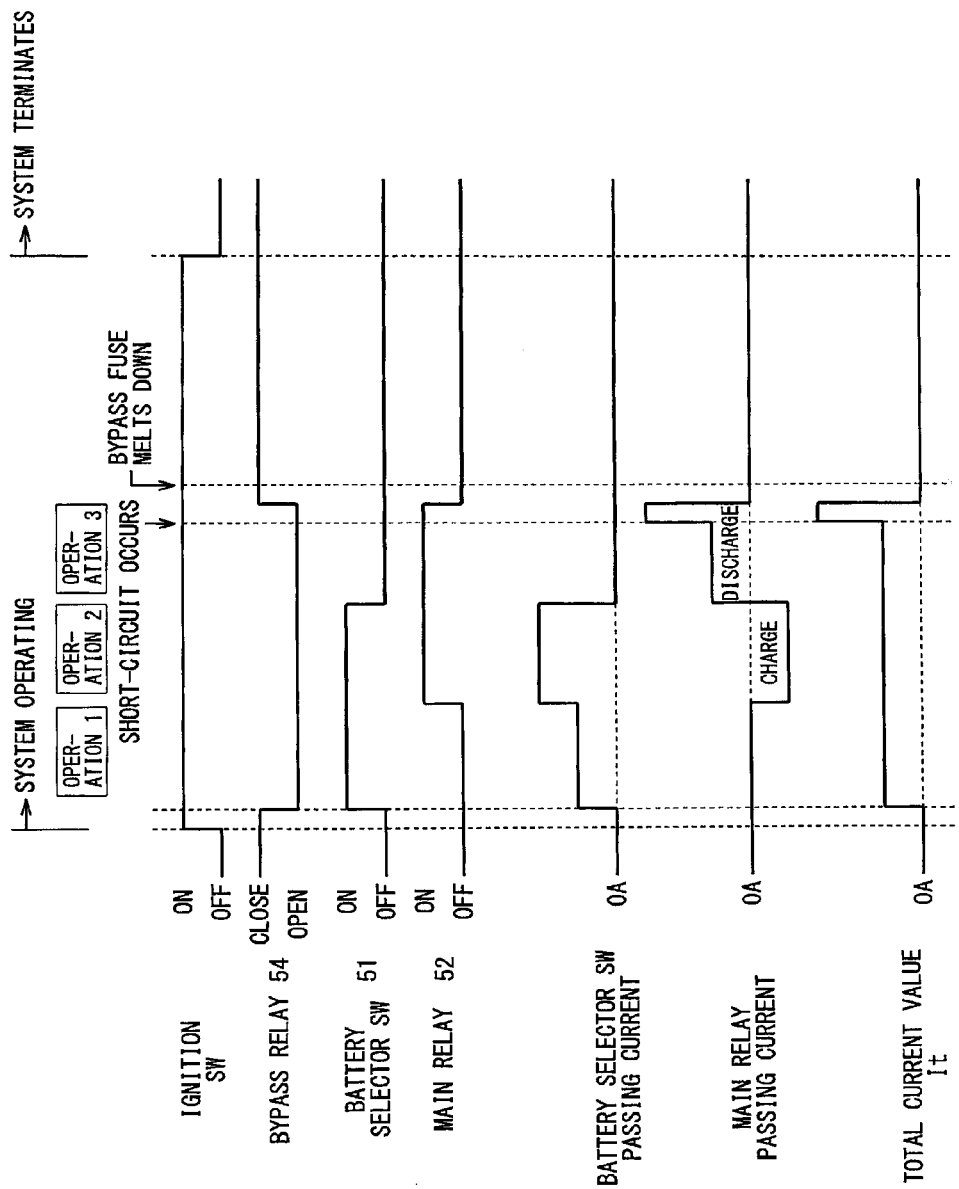
FIG. 5 is a time chart for explaining operations of the in-vehicle power source device illustrated in FIG. 1.

Moreover, as in the above operation 3, if the electric line connecting the output unit of the battery pack 57 and the second electric load 35 has short circuited, as illustrated in FIG. 3, while power is being supplied to the second electric load 35 from the second power source 34, the current flowing to the main relay 52 increases, and the total current value It becomes equal to or greater than the predetermined value Id, as illustrated in FIG. 5. Therefore, the main relay 52 is turned off and the bypass relay 54 is closed, thereby preventing flow of a large current from the second power source 34 to the short circuit portion E. Accordingly, failure of the electric wire and the substrate of the battery pack 57 do not occur.

Furthermore, when an overcurrent flows via the bypass relay 54 in the case where the battery pack 57 is abnormal and the ignition switch is off, the bypass fuse 53 melts down.

With such an in-vehicle power source device, since the bypass fuse 53 that melts down when an overcurrent flows to the second electric load 35 is deployed outside of the case 58, workability for replacing the bypass fuse 53 is favorable. Moreover, when the bypass fuse 53 is deployed in an engine room, an in-vehicle fuse box, a relay box or the like, the bypass fuse 53 may be easily replaced. Furthermore, a place for arranging the bypass fuse 53 can be freely determined, and thus manufacturing cost can be decreased. Since the bypass fuse 53 does not need to be provided near the battery pack 57, an exclusive fuse socket is not required. Furthermore, a fuse is not provided between the output unit of the battery pack 57 and the second electric load 35. Therefore, a large current does not flow through the electric wire running from the output unit of the battery pack 57 to the second electric load 35, and failure of the electric wire and the substrate of the battery pack 57 can be avoided. In addition, since the bypass relay 54 is deployed outside of the case 58, workability for replacing the bypass relay 54 is favorable. Furthermore, use of already available bypass fuse 53 and bypass relay 54 is possible, and thus manufacturing cost can be decreased.

Even in a state where the bypass fuse 53 has melted down, power may be supplied to the second electric load 35 via the battery selector switch 51. Therefore, if the battery selector switch 51 is turned on when the ignition switch is on, assuming that a short circuit is not corrected, the battery selector switch 51 detects an overcurrent and is turned off. This prevents a large current from flowing to a short circuit portion. On the other hand, when a short circuit is corrected, the battery selector switch 51 does not detect an overcurrent, and thus the battery selector switch 51 remains on, allowing supply of power to the second electric load 35.

Since the bypass fuse 53 and the bypass relay 54 are deployed outside of the case 58, even when the battery pack 57 has been removed, power can be supplied to the second electric load 35 via the bypass fuse 53 and the bypass relay 54.

If a current value detected by the battery selector switch 51 and a current value detected by the main relay 52 are added together so as to calculate a total current value It, and the total current value It is equal to or greater than a predetermined value Id, short circuit processing is conducted, and thus short circuit processing can be conducted with a simple configuration. Moreover, since the battery selector switch 51 having a current detecting function and the main relay 52 having a current detecting function are used, current flowing to the second electric load can be detected with a simple configuration.

Second Embodiment

Figure 6:
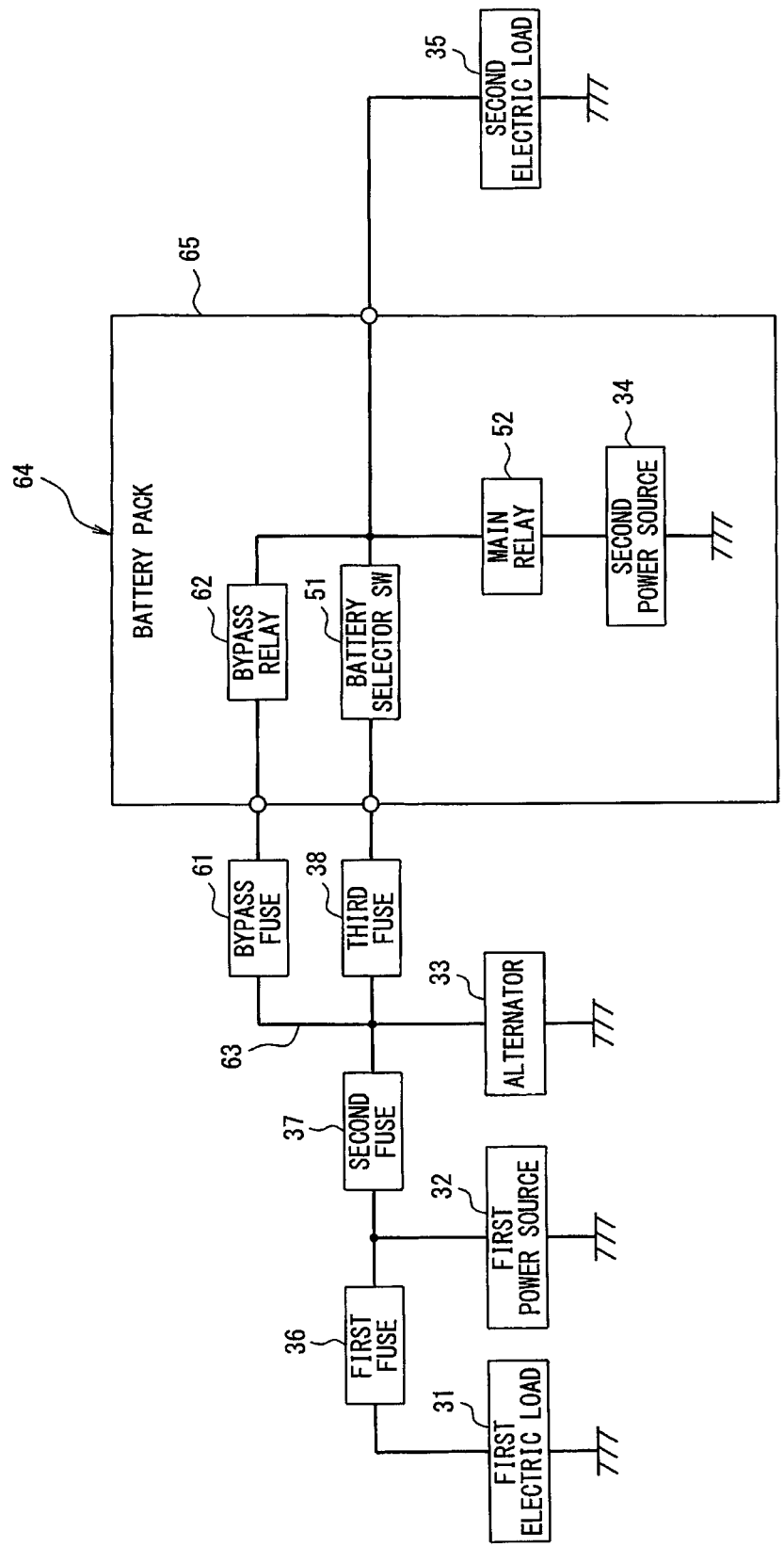
FIG. 6 illustrates a power source system of an in-vehicle power source device, according to an embodiment of the present invention.
Figure 7:
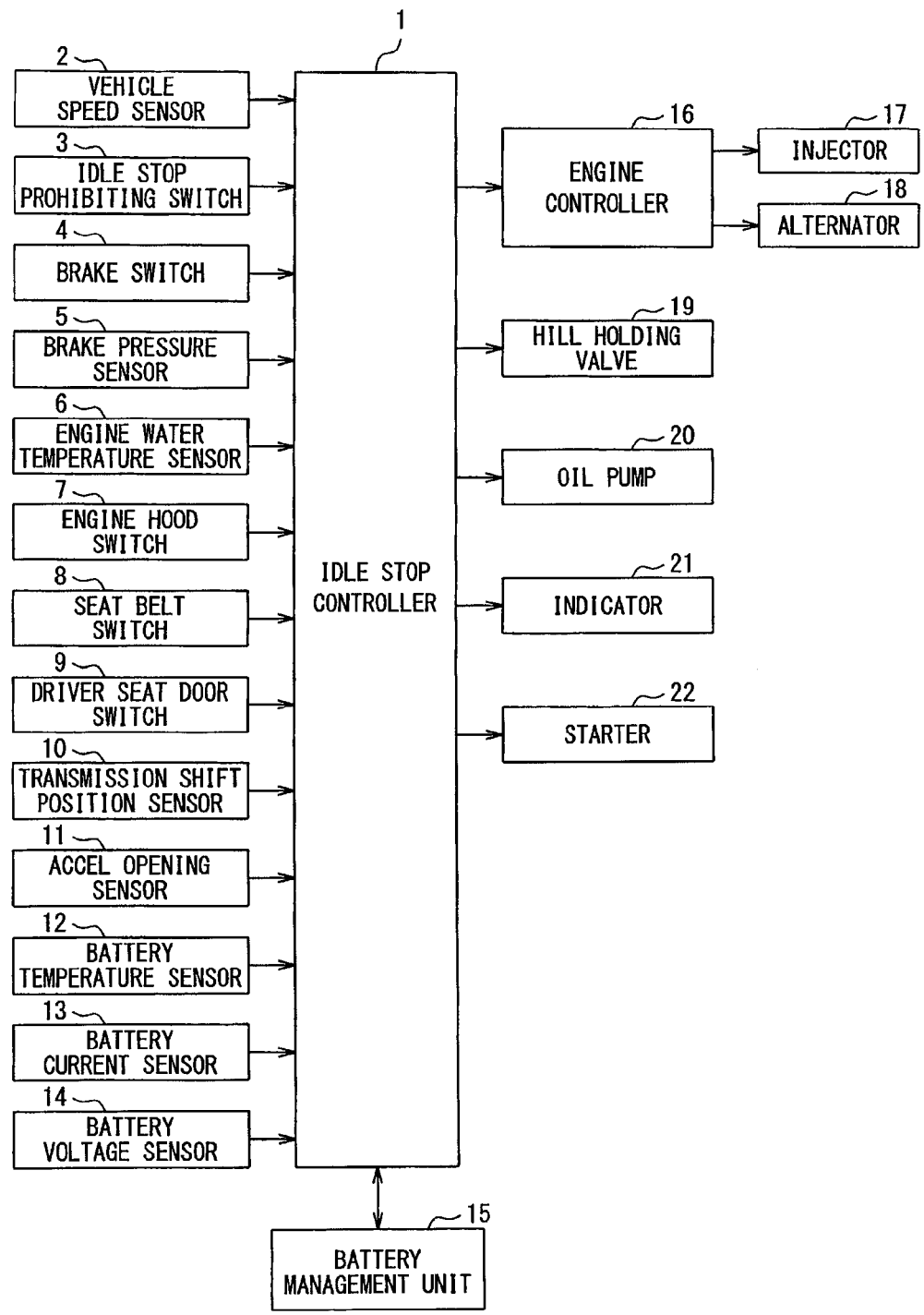
FIG. 7 is a block diagram illustrating an idle stop system having a conventional in-vehicle power source device.
Figure 8:
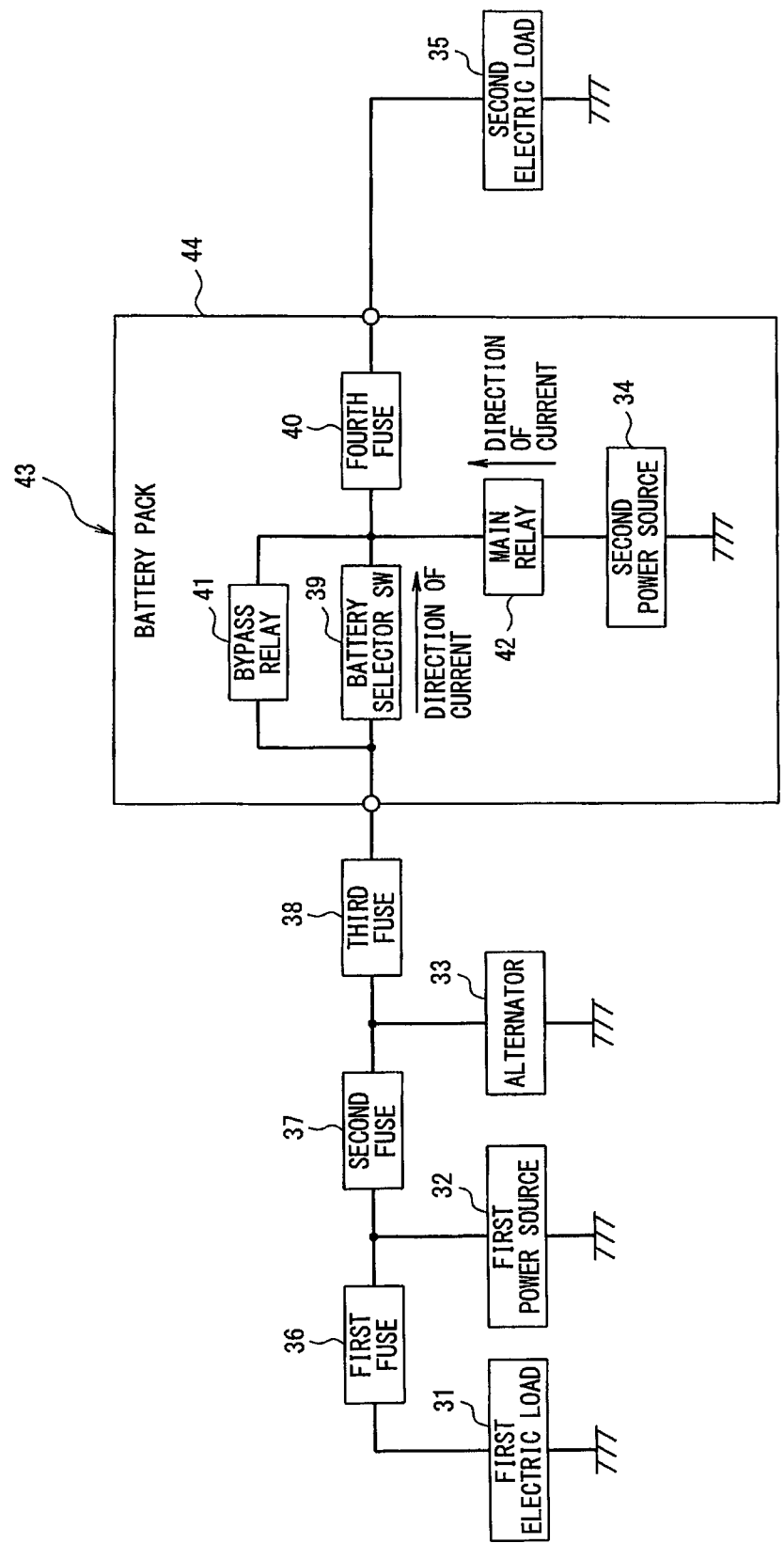
FIG. 8 illustrates a power source system of the conventional in-vehicle power source device.
Figure 9:
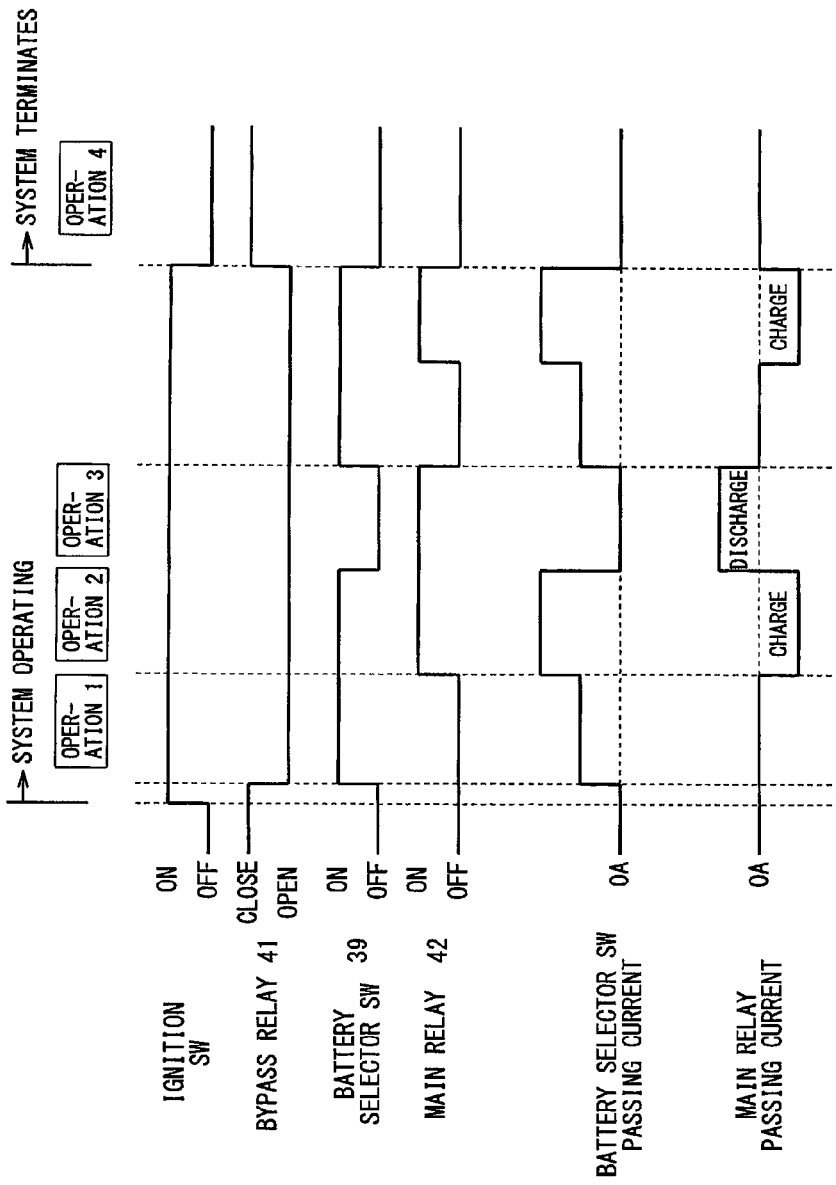
FIG. 9 is a time chart for explaining operations of the in-vehicle power source device illustrated in FIG. 8.
Figure 10:
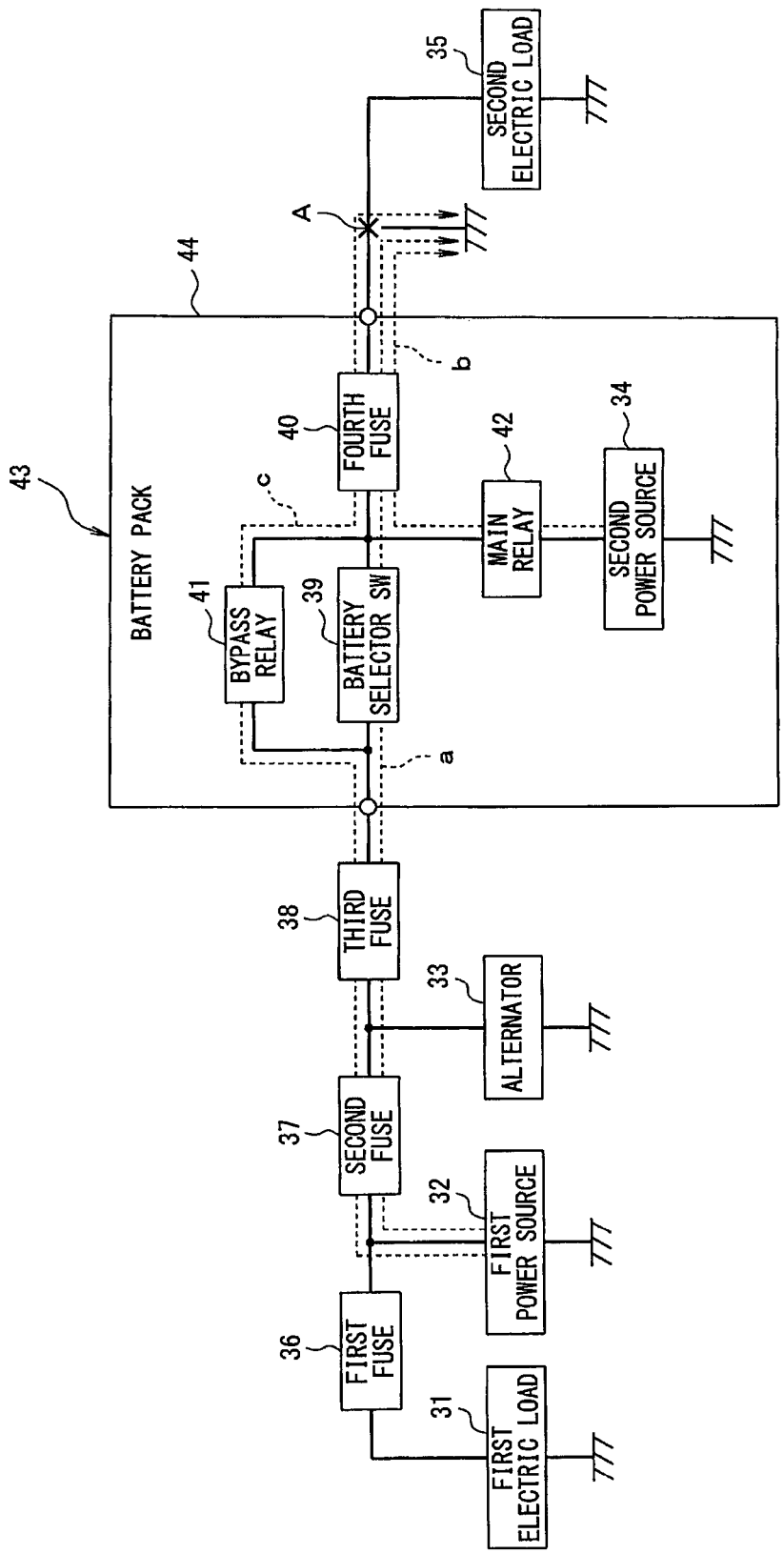
FIG. 10 is a diagram for explaining operations of the in-vehicle power source device illustrated in FIG. 8.
Figure 11:
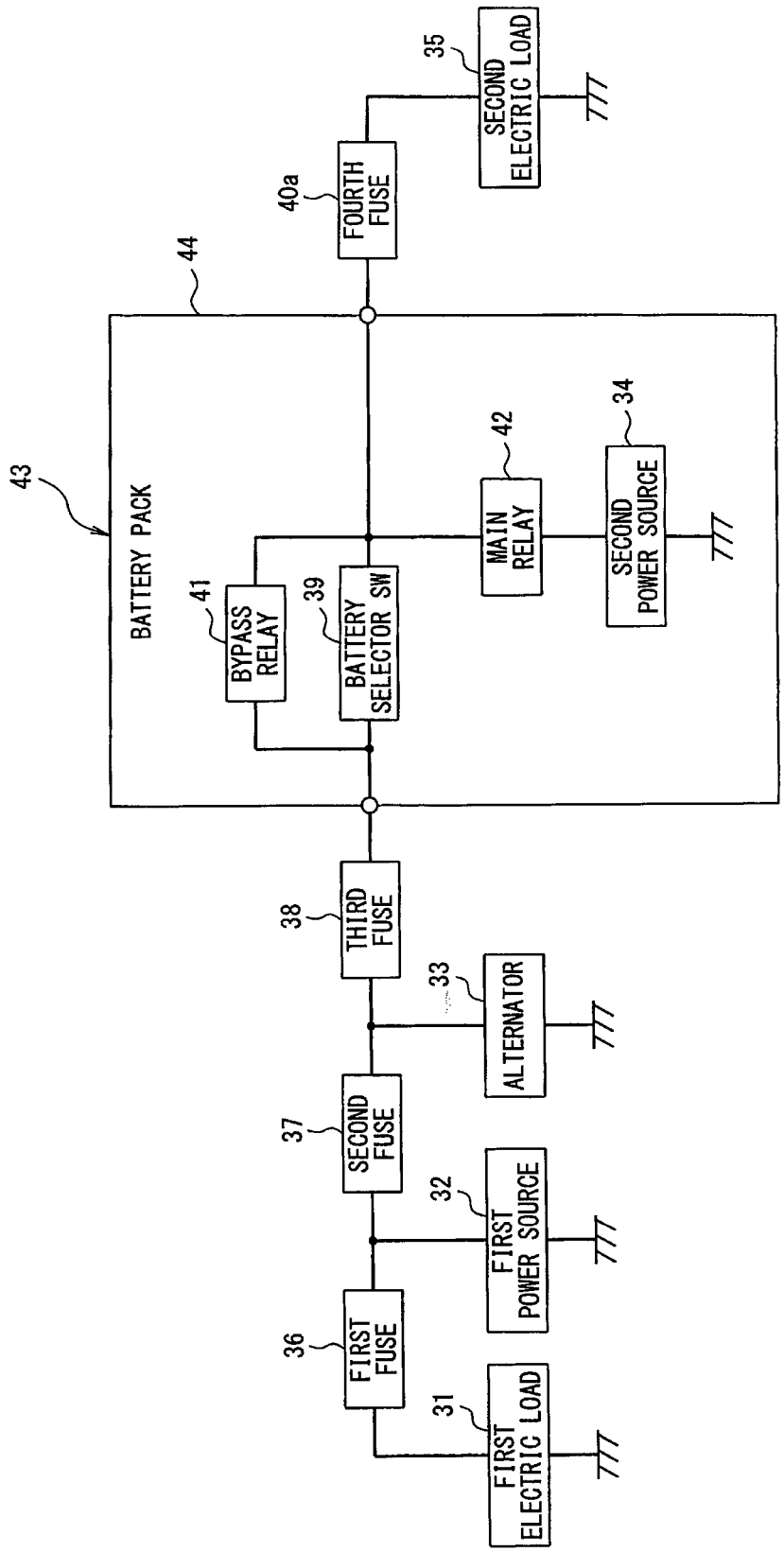
FIG. 11 illustrates a power source system of a conventional in-vehicle power source device.
Figure 12:
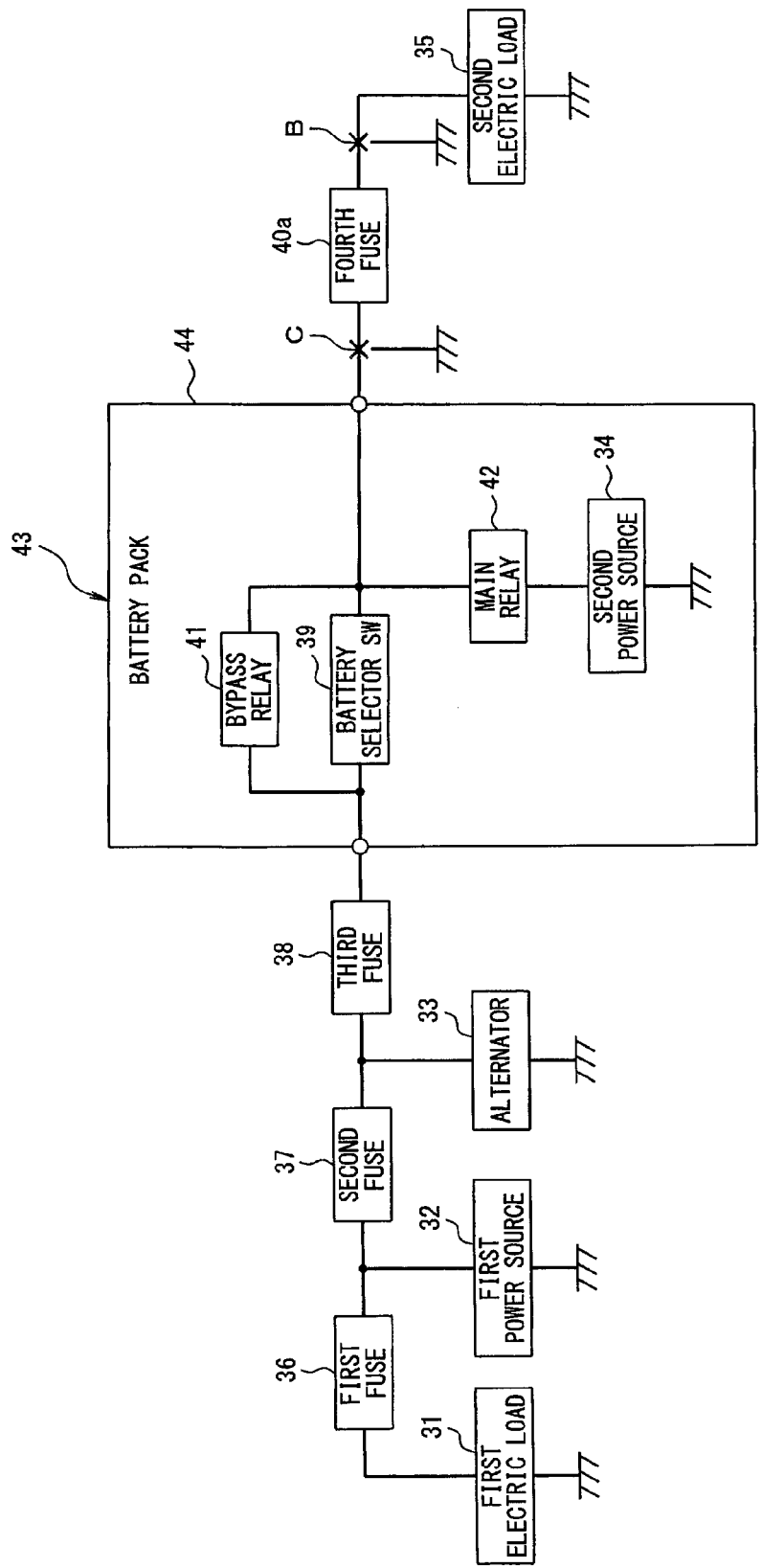
FIG. 12 is a diagram for explaining operations of the in-vehicle power source device illustrated in FIG. 11.
Figure 13:
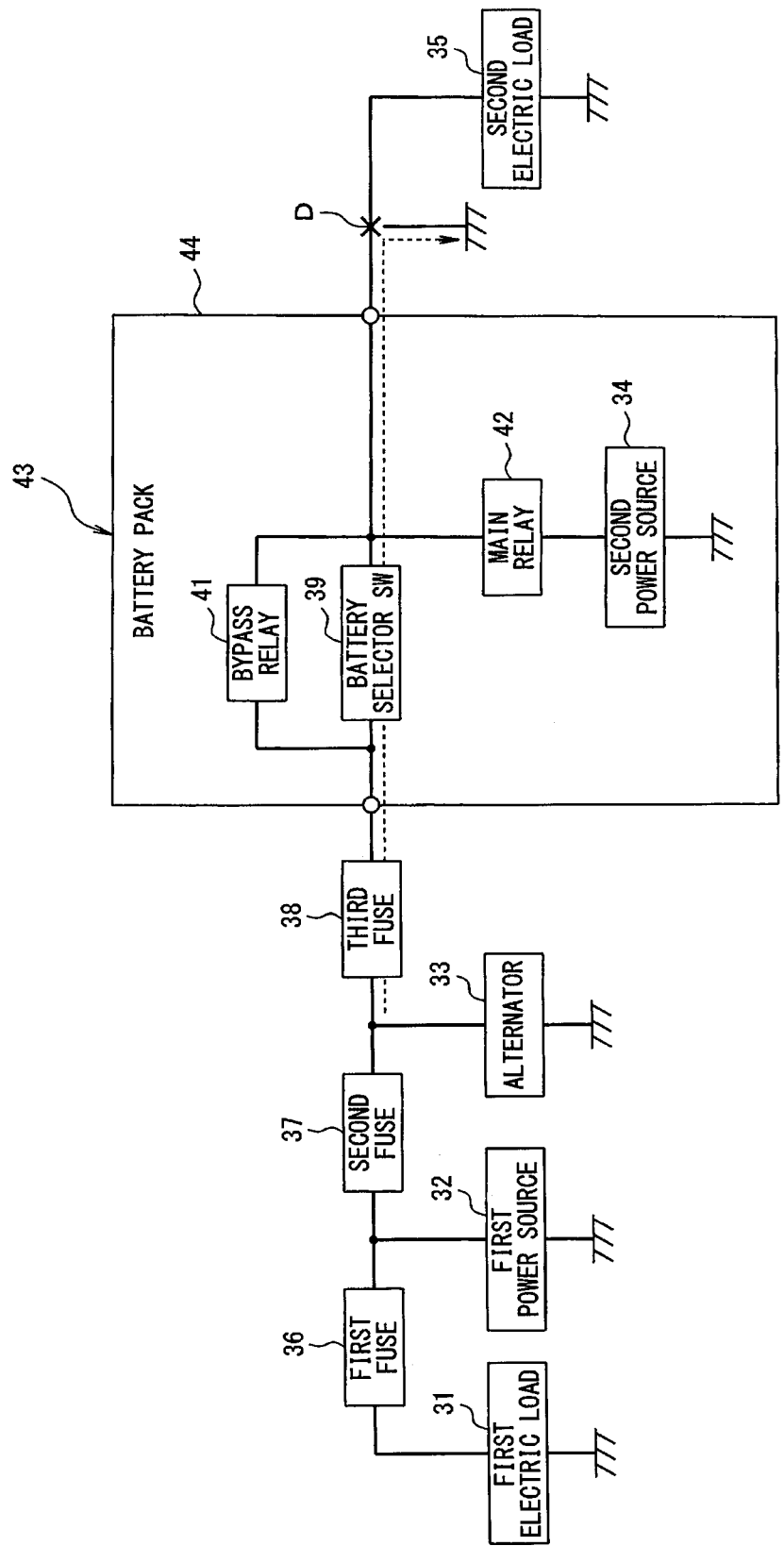
FIG. 13 illustrates a power source system of a conventional in-vehicle power source device.

An in-vehicle power source device according to another embodiment of the present invention will be described with reference to FIG. 6.

A bypass circuit 63 connecting the second fuse 37 and the third fuse 38 and also connecting the battery selector switch 51 and the second electric load 35 is provided. A normally closed-type bypass relay 62 and a bypass fuse 61 are connected in series to the bypass circuit 63. That is, the bypass relay 62 bypasses the battery selector switch 51. The battery pack 64 includes the second power source 34, the battery selector switch 51, the main relay 52, and the bypass relay 62. The second power source 34, the battery selector switch 51, the main relay 52, and the bypass relay 62 are stored in a case 65 of the battery pack 64. The bypass fuse 61 is deployed outside of the case 65. The rest of the configuration is the same as the in-vehicle power source device illustrated in FIG. 1.

With this in-vehicle power source device, when the ignition switch is turned on, the battery management unit (not illustrated) provided in the battery pack 64 calculates the total current value It. If the total current value It is less than a predetermined value Id, normal operation is conducted. Otherwise, if it is equal to or greater than the predetermined value Id, short circuit processing is conducted. That is, the battery selector switch 51 and the main relay 52 are turned off, and the bypass relay 62 is closed (turned on). Note that also when the battery pack 64 is abnormal, and when the ignition switch is off, the battery selector switch 51 and the main relay 52 are turned off, and the bypass relay 62 is closed.

With such an in-vehicle power source device, since the bypass fuse 61 that melts down when an overcurrent flows to the second electric load 35 is deployed outside of the case 65, workability for replacing the bypass fuse 61 is favorable.

Other Embodiments

Note that in the above embodiments, the battery selector switch 51 having a current detecting function and the main relay 52 having a current detecting function are employed. That is, in the above embodiments, a first current detector for detecting a current flowing to the first opening-closing switch (battery selector switch 51) is provided within the first opening-closing switch, and a second current detector for detecting a current flowing to the second opening-closing switch (main relay 52) is provided within the second opening-closing switch. In other words, the first and the second current detector for detecting current flowing to an electric load (second electric load 35) are provided within the first and the second opening-closing switch, respectively. However, the first and the second current detector may be provided outside of the second opening-closing switch.

Moreover, in the above embodiments, while the battery selector switch 51 is provided as the first opening-closing switch, the first opening-closing switch is not limited to the battery selector switch 51. Furthermore, in the above embodiments, while the main relay 52 is provided as the second opening-closing switch, the second opening-closing switch is not limited to the main relay 52. Even further, in the above embodiments, while the bypass relay 54 is provided as the bypass switch, the bypass switch is not limited to the bypass relay 54.

Yet even further, in the above embodiments, the battery selector switch 51 and the main relay 52 are turned off and the bypass relay 54 is closed when the total current value It is equal to or greater than the predetermined value id. However, when a current detected by the battery selector switch 51 is equal to or greater than a predetermined value, the battery selector switch 51 may be turned off and the bypass relay 54 may be closed. When a current detected by the main relay 52 is equal to or greater than a predetermined value, the main relay 52 may be turned off.

The present invention is not particularly limited to the exemplary embodiments described and illustrated in detail, and includes all embodiments bringing about the same results according to the object of the present invention. Moreover, the present invention is not limited to combination of aspects of the invention claimed by the appended claims, and may be attained by some of various desired combinations of all disclosed aspects.

REFERENCE SIGNS LIST

31 . . . first electric load, 32 . . . first power source, 33 . . . alternator, 34 second power source, 35 . . . second electric load, 51 . . . battery selector switch, 52 . . . main relay, 53 . . . bypass fuse, 54 . . . bypass relay, 57 . . . battery pack, 58 case, 61 . . . bypass fuse, 62 . . . bypass relay, 64 . . . battery pack, 65 . . . case

The invention claimed is:

1. An in-vehicle power source device comprising:
a first power source and a second power source for providing power to at least one electric load;
a first opening-closing switch in a first feed line between the electric load and the first power source;
a second opening-closing switch in a second feed line between the electric load and the second power source;
a bypass switch in a bypass circuit configured to bypass the first opening-closing switch;
a fuse in the bypass circuit;
a current detector configured to detect a current fed to the electric load;
a case configured to store the second power source,
wherein the fuse is positioned outside of the case to be protected,
wherein the fuse and the bypass switch are connected in series,
wherein the first opening-closing switch and the second opening-closing switch are connected in parallel, and
wherein the device further includes a drive circuit configured to turn off the first and second opening-closing switches and turn on the bypass switch when the current detected by the current detector is equal to or greater than a predetermined value.

2. The in-vehicle power source device according to claim 1, wherein the bypass switch is positioned outside of the case.

3. The in-vehicle power source device according to claim 1, wherein the current detector comprises a first current detector configured to detect a current passing through the first opening-closing switch, and a second current detector configured to detect a current passing through the second opening-closing switch, and wherein
the drive circuit is configured to turn off the first and second opening-closing switches and turn on the bypass switch when a total sum of a current detected by the first current detector and a current detected by the second current detector current is equal to or greater than a predetermined value.

4. The in-vehicle power source device according to claim 1, wherein
the bypass circuit is arranged so that all current from the first power source passes therethrough to prevent the current from the first power source from entering the case when the drive circuit turns off the first and second opening-closing switches and turns on the bypass switch.

5. The in-vehicle power source device according to claim 4, wherein
the fuse in the bypass circuit is configured to melt down when current passing through the bypass circuit becomes excessively high.

6. The in-vehicle power source device according to claim 5, wherein
the current detected by the current detector is a total sum of a current passing through the first opening-closing switch and a current passing through the second opening-closing switch.

7. The in-vehicle power source according to claim 6, wherein the second opening-closing switch is positioned in the case.

8. The in-vehicle power source according to claim 7, wherein the first opening-closing switch is positioned inside the case.

9. The in-vehicle power source according to claim 1, wherein the second opening-closing switch is positioned in the case.

10. The in-vehicle power source according to claim 9, wherein the first opening-closing switch is positioned inside the case.

* * * * *